United States Patent

(12) United States Patent
Luling

(10) Patent No.: US 8,942,925 B2
(45) Date of Patent: Jan. 27, 2015

(54) DETERMINATION OF COMPLEX DIELECTRIC CONSTANTS FROM ELECTROMAGNETIC PROPAGATION MEASUREMENTS

(75) Inventor: Martin Luling, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 746 days.

(21) Appl. No.: 12/810,219

(22) PCT Filed: Dec. 10, 2008

(86) PCT No.: PCT/EP2008/010560
§ 371 (c)(1),
(2), (4) Date: Aug. 25, 2010

(87) PCT Pub. No.: WO2009/083114
PCT Pub. Date: Jul. 9, 2009

(65) Prior Publication Data
US 2010/0324826 A1    Dec. 23, 2010

(30) Foreign Application Priority Data

Dec. 28, 2007   (EP) .................................. 07150457

(51) Int. Cl.
G01V 3/38    (2006.01)
G01V 3/30    (2006.01)
(52) U.S. Cl.
CPC ........................................ *G01V 3/30* (2013.01)
USPC ........................................................... 702/7
(58) Field of Classification Search
USPC ........................................................... 702/7
See application file for complete search history.

(56) References Cited

U.S. PATENT DOCUMENTS 3,944,910 A    3/1976  Rau
4,107,597 A *  8/1978  Meador et al. ............... 324/341
(Continued)

FOREIGN PATENT DOCUMENTS

GB    2411729    9/2005

OTHER PUBLICATIONS

R. M.A. Azzam, Extrema of the magnitude and the phase of a complex function of a real variable: application to attenuated internal reflection, Aug. 1, 1988, 7 pages.*

(Continued)

*Primary Examiner* — Tung S Lau
(74) *Attorney, Agent, or Firm* — Stephanie Chi; Jody DeStefanis

(57) ABSTRACT

A method of determining the dielectric constant of a formation, comprising acquiring phase-related and amplitude-related measurements for electromagnetic signals propagating though the formation from a transmitter to a receiver; deriving a complex-valued quantity comprising terms relating to the phase shift and attenuation of the signals; defining a one-component complex-valued relationship relating the phase shift, attenuation and complex dielectric constant; and using the derived complex-valued quantity in the defined relationship to obtain a calculated value of the complex dielectric constant. An apparatus for determining the dielectric constant of a formation, comprises a transmitter for transmitting electromagnetic signals into the formation; a receiver for receiving the electromagnetic signals that have propagated from the transmitter through the formation; and means for determining the dielectric constant of the formation in accordance with a method according to the first aspect of the invention.

11 Claims, 2 Drawing Sheets

(56) References Cited

U.S. PATENT DOCUMENTS 4,704,581 A    11/1987   Clark
4,899,112 A    2/1990   Clark et al.
2004/0073371 A1   4/2004   Haugland

OTHER PUBLICATIONS

Dakermandji G et al "A new method for measuring the electrical properties of sea water and wet earth at microwave frequencies" IEEE Transactions on Instrumentation and Measurement USA, vol. IM-26, No. 2, Jun. 1977—pp. 124-127, XP002487605—ISSN:0018-9456 abstract.

Anderson, Barbara Et Al.: 'Observations of Large Dielectric Effects on Lwd Propagation-Resistivity Logs' Spwla 48th Annual Logging Symposium Jun. 3, 2007.

Jackson, J. D.: 'Classical Electrodynamics', 1975, Wiley pp. 397-401.

\* cited by examiner

DETERMINATION OF COMPLEX DIELECTRIC CONSTANTS FROM ELECTROMAGNETIC PROPAGATION MEASUREMENTS

TECHNICAL FIELD

This invention relates to the interpretation of electromagnetic measurements in underground formations. In particular, the invention relates to the determination of dielectric constants from electromagnetic propagation measurements. Such measurements can be made in oil and gas wells and are useful for the evaluation of the formations through which the well passes.

BACKGROUND ART

Electromagnetic waves have long been used to measure the saturation and salinity of water in porous rocks. The electromagnetic measurements use propagating radio waves and determine the phase and amplitude of the received signal for known transmitter-receiver geometries and operating frequencies. These phase and amplitude measurements are independent; they are converted to apparent dielectric permittivity and electric conductivity for some tools, such as the Electromagnetic Propagation Tool (EPT) or the Deep Propagation Tool (DPT), both of Schlumberger.

Electromagnetic-propagation measurements were invented and first introduced in the formation-evaluation industry in the 1970s. Several generations and implementations of these tools used similar algorithms to convert the measured phases and amplitudes to apparent resistivities or to invert them to apparent dielectric permittivity and electric conductivity. Examples of such techniques can be found in U.S. Pat. No. 3,944,910, U.S. Pat. No. 4,704,581 and U.S. Pat. No. 4,899,112.

Many electromagnetic measurement devices use a differential receiver configuration. Two receivers are placed at known ($r_{near}$ and $r_{far}$) distances from the transmitter and with known relative orientation to the transmitter dipole moment (typically aligned). The differential signal V simply is the ratio of the two raw signals. The phase difference between the two receivers is called the phase shift $$PS(=\phi_{far}-\phi_{near}),$$

and the difference of the amplitude logarithms (or logarithmic amplitudes) is called attenuation $$AT(=\alpha_{near}-\alpha_{far}).$$

The purpose of these electromagnetic measurements is to determine the electric conductivity of the surrounding medium from the observed phase and amplitude, or phase shift and attenuation. The dielectric measurement determines the two unknowns: electric conductivity and dielectric permittivity simultaneously from the two measurements: phase shift and attenuation.

Commonly, the measurements are converted to an apparent electric conductivity (or resistivity $R=1/\sigma$) using interpolation in pre-computed look-up tables. The simultaneous conversion of phase shift and attenuation into apparent dielectric permittivity and electric conductivity requires a two-dimensional look-up table. Such tables have been published and are widely accepted in the industry.

As an alternative approach, the measured phase shift and attenuation data can be inverted directly for permittivity $\in$ and conductivity $\sigma$ as is discussed in ANDERSON, Barbara, et al. OBSERVATIONS OF LARGE DIELECTRIC EFFECTS ON LWD PROPAGATION-RESISTIVITY LOGS. *SPWLA 48th Annual Logging Symposium.* 3-6 Jun. 2007. The iterative inversion algorithm minimizes the sum of the squared differences between the measured quantities and computed signals that are functions of the relative dielectric permittivity and the electric conductivity $$L = \frac{1}{2}\left( \begin{array}{l} (PS_{meas} - PS_{simul}^{(n)}(\varepsilon_r^{(n)}, \sigma^{(n)}))^2 + \\ (AT_{meas} - AT_{simul}^{(n)}(\varepsilon_r^{(n)}, \sigma^{(n)}))^2 \end{array} \right)$$

The values for permittivity and conductivity are iteratively updated (by the index n) to reconcile the simulated with the measured data and thus arrive at the best estimate for the relative dielectric permittivity and the electric conductivity. The n-th iteration for the permittivity and conductivity are calculated from the (n−1)-th iteration by a linear correction $$\begin{pmatrix} \varepsilon_r^{(n)} \\ \sigma^{(n)} \end{pmatrix} = \begin{pmatrix} \varepsilon_r^{(n-1)} \\ \sigma^{(n-1)} \end{pmatrix} + \begin{pmatrix} \frac{\partial \varepsilon_r}{\partial PS} & \frac{\partial \varepsilon_r}{\partial AT} \\ \frac{\partial \sigma}{\partial PS} & \frac{\partial \sigma}{\partial AT} \end{pmatrix} \begin{pmatrix} PS_{meas} - PS_{simul}^{(n-1)} \\ AT_{meas} - AT_{simul}^{(n-1)} \end{pmatrix}$$

Previous implementations of this standard inversion algorithm always computed the four partial derivatives independently. These computations are the most time-consuming step in the iteration.

This invention aims to provide a computationally less intensive approach that uses the phase shift and attenuation measurements to derive a complex-valued quantity, and uses this complex-valued quantity for computations of the parameters of interest.

SUMMARY

A first aspect of the invention provides a method of determining the dielectric constant of a formation, that incudeas; acquiring phase-related and amplitude-related measurements for electromagnetic signals propagating though the formation from a transmitter to a receiver; deriving a complex-valued quantity comprising terms relating to the phase or the phase shift and the amplitude or the attenuation of the signals; defining a one-component complex-valued relationship relating the phase-amplitude pair or the phase-shift-attenuation pair and the complex dielectric constant; and using the derived complex-valued quantity in the defined relationship to obtain a calculated value of the complex dielectric constant.

The phase related measurements can be phase and/or phase shift. The amplitude measurements can be amplitude and/or attenuation.

Preferably, the derived complex-valued quantity has the form PS+iAT, where PS is related to the phase shift and AT is related to the attenuation.

The method can further comprise calculating simulated values of the phase shift and attenuation and using these simulated values in the defined relationship to obtain the calculated value of the complex dielectric constant. In this case the relationship preferably has the iterative form $$\varepsilon_r^{*(n)} = \varepsilon_r^{*(n-1)} + \left(\frac{\partial(PS+iAT)}{\partial \varepsilon_r^*}\right)^{-1} \binom{(PS_{meas} - PS_{simul}^{(n-1)}) +}{i(AT_{meas} - AT_{simul}^{(n-1)})}$$

where $\varepsilon_r^*(=\varepsilon_r + i\sigma/\omega\varepsilon_0)$ is the complex dielectric constant, the superscripts n−1 and n relate to the n−1$^{th}$ and n$^{th}$ iterations respectively, and the subscripts meas and simul indicate measured and simulated values respectively.

Computing $PS_{simul}^{m-1}$ and $AT_{simul}^{n-1}$ can comprise using an initial value of $\varepsilon_r^*$, comparing the computed values with corresponding measured values and comparing any difference to a predetermined error margin, updating the value of $\varepsilon_r^*$ and repeating the computation and comparison until the difference falls within the predetermined error margin.

The method can also comprise computing a value for measurement sensitivities in the form $(\partial PS + i\partial AT)/\partial\varepsilon_r^*$.

When the electromagnetic signals are signals propagating through the formation from a transmitter to near and far receivers, the method can comprise obtaining a value of wave number k and using this and the value of $\varepsilon_r^*$ to compute $PS_{simul}^{m-1}$, $AT_{simul}^{n-1}$ and $$\frac{\partial(PS+iAT)}{\partial\varepsilon^*}$$

using the relationships $$i\ln\frac{U_{near}}{U_{far}} = PS + iAT$$
$$= k(r_{far} - r_{near}) + 3i\ln\frac{r_{far}}{r_{near}} + i\ln\left(\frac{1-ikr_{near}}{1-ikr_{far}}\right)$$

and $$\frac{\partial(PS+iAT)}{\partial\varepsilon^*} = \frac{\partial(PS+iAT)}{\partial k}\frac{\partial k}{\partial\varepsilon^*}$$
$$= \left[\frac{(r_{far} - r_{near}) +}{1-ikr_{near}} - \frac{r_{far}}{1-ikr_{far}}\right]\frac{\omega}{2c}\sqrt{\frac{\mu}{\varepsilon^*}}$$

where $U_{near}$ and $U_{far}$ are the near and far receiver signals, $r_{near}$ and $r_{far}$ are the distances from the transmitter to the near and far receiver, $\omega$ is the circular frequency and $\mu$ is the magnetic permeability.

The method according to the first aspect of the invention can be used in determining the resistivity of the formation from the complex dielectric constant.

BRIEF DESCRIPTION OF FIGURES IN THE DRAWINGS

DETAILED DESCRIPTION

Figure 1:
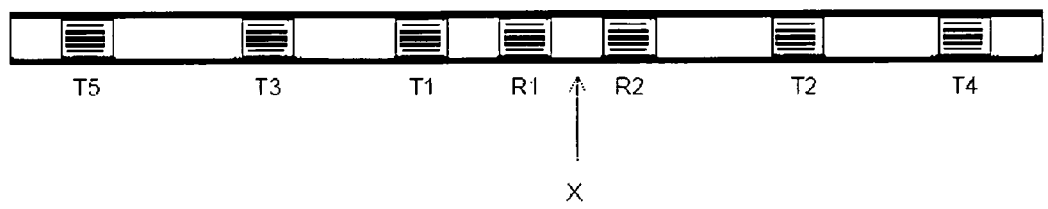
FIG. 1 shows a tool for use with a method according to the invention.

Any electromagnetic-propagation measurement emits a signal from a transmitter and detects it at a receiver. The received signal differs in amplitude and phase from the emitted signal. In general it is written as complex-valued receiver voltage U* with its amplitude A and phase $\phi$:

$$U^* = Ae^{i\phi} = U_0 e^{\alpha+i\phi}$$

Here a voltage $U_0$ of arbitrary normalization describes the transmitter signal, so that the transmitter amplitude and an exponential replace the receiver amplitude $$A = U_0 e^\alpha.$$

Commonly, the received signal is given as the logarithm of this voltage, where the transmitter amplitude is discarded; the phase is converted to degrees and the amplitude to decibel (dB):

$$-i\ln(U^*) = -i\ln(U_0) + \phi - i\alpha \rightarrow \frac{180°}{\pi}\phi - i\frac{20}{\ln(10)}\alpha$$

The factors $180°/\pi$ and $20/\ln(10)$ convert radian to degree and natural logarithm to decibel, respectively. They are merely engineering conventions without any scientific significance and are not used further here.

For an electromagnetic propagation tool with a differential receiver configuration (see above), the differential signal V simply is the ratio of the two raw signals.

$$V = i\ln\left(\frac{U^*_{near}}{U^*_{far}}\right) = i\ln\left(\frac{U_0 e^{i\phi_{near}+\alpha_{near}}}{U_0 e^{i\phi_{far}+\alpha_{far}}}\right)$$
$$= i(i(\phi_{near} - \phi_{far}) + (\alpha_{near} - \alpha_{far}))$$
$$= (\phi_{far} - \phi_{near}) + i(\alpha_{near} - \alpha_{far})$$
$$= PS + iAT$$

In the context of the present invention, it is the combination of the independent phase and amplitude (or phase-shift and attenuation) measurements into a single, complex-valued quantity that is used to obtain the particular advantage in computation simplicity.

The purpose of electromagnetic measurements is to determine the electric conductivity of the surrounding medium from the observed phase and amplitude, or phase shift and attenuation. The dielectric measurement determines the two unknowns: electric conductivity and dielectric permittivity simultaneously from the two measurements: phase shift and attenuation.

Electromagnetic propagation measurements use antennas that are substantially dipoles, mostly magnetic dipoles. For an approximate magnetic point dipole transmitter $M_T$ and receiver $M_R$, the Green function in a homogeneous medium is given in close-form expression; see, for example, JACKSON, J. D. Classical Electrodynamics. 2nd edition. Wiley, 1975. ch. 9.3, pp 397-401.

The electromagnetic signals propagating from the transmitter to the receiver are always described by Green functions. The Green functions fulfil the electromagnetic wave equation, which is derived from Maxwell's equations and which parameterized by a complex-valued wave number k. This wave number in turn is a function of the electric conductivity $\sigma$ and the relative dielectric permittivity $\varepsilon_r$, given by:

$$k = \sqrt{i\omega\mu_0\mu_r}\sqrt{\sigma - i\omega\varepsilon_0\varepsilon_r}$$
$$= \frac{\omega}{c}\sqrt{\mu_r}\sqrt{\varepsilon_r + i\frac{\sigma}{\omega\varepsilon_0}}$$

with circular frequency ω, the speed of light in vacuum c and the magnetic permeability $\mu=\mu_0\mu_r$. Hence the dielectric permittivity $\in_r$ and the scaled electric conductivity $\sigma/\omega\in_0$ are combined into a single, complex-valued quantity, which is called the "complex dielectric constant" $\in^*=\in_r+i\sigma/\omega\in_0$. On some occasions the conductivity scale is shifted from the electric conductivity σ to the dielectric permittivity $\in_r$, giving the "complex conductivity" $\sigma^*=\sigma-i\omega\in_0\in_r$.

The complex dielectric constant $\in_r$ serves as independent input parameter that controls the wave number k and that way the Green function of the signal from transmitter to receiver. Combining the wave number with the point-dipole Green function yields the complex-valued transmitter-receiver signal as an elementary function of the complex dielectric constant.

The Green function of electromagnetic radiation describes the complex-valued transmitter-receiver signals as holomorphic functions of the complex dielectric constant. Hence the phase and amplitude (or the phase shift and attenuation) as real and imaginary part of the received signal obey Cauchy-Riemann identities in their dependence on the electric conductivity and dielectric permittivity:

$$\frac{\partial PS}{\partial \sigma} = \frac{\partial AT}{\omega\varepsilon_0 \partial \varepsilon_r}$$
$$\frac{\partial AT}{\partial \sigma} = -\frac{\partial PS}{\omega\varepsilon_0 \partial \varepsilon_r}$$

The electromagnetic measurements (phase shift and attenuation) can be simultaneously inverted for the relative dielectric permittivity and the electric conductivity. As alternative to the traditional look-up-table method, the invention uses an iterative inversion algorithm as described above. Such an iterative inversion algorithm provides considerable advantages: it is numerically more stable, converges rapidly and involves the explicit Green-function expressions.

The updated permittivity and conductivity obtained from the iterative inversion algorithm are then used to determine the updated wave number and Green function and finally the updated phase shift and attenuation simulation.

Previous implementations of this standard inversion algorithm always computed the four partial derivatives independently. These computations are the most time-consuming step in the iteration. Replacing two of these computations with the Cauchy-Riemann identities simplifies the algorithm and reduces the computational effort by 50%.

Furthermore, the real-valued two-component vectors ($\in_r$ σ) and (PS AT) are replaced by their equivalent complex-valued notation. The iterative relationship becomes:

$$\varepsilon_r^{*(n)} = \varepsilon_r^{*(n-1)} + \left(\frac{\partial (PS+iAT)}{\partial \varepsilon_r^*}\right)^{-1} \binom{(PS_{meas} - PS_{simul}^{(n-1)})+}{i(AT_{meas} - AT_{simul}^{(n-1)})}$$

This complex-valued equation can be programmed in a programming language that supports complex arithmetic, such as FORTRAN. The complex arithmetic reduces two-component real vector algebra to a simpler, one-component complex-valued relationship. This simplification further reduces the computational effort by another factor of two to a total computational saving of 75% compared to previously used algorithms.

FIG. 1 shows a diagram of a resistivity sonde that can be used to make electromagnetic propagation measurements that can be used in the present invention. This sonde comprises a pair of receivers R1 and R2, each positioned 3" (7.5 cm) on either side of a measure point X. Five transmitters T1-T5 are positioned on the sonde, three on one side of the measure point X (T1, T3 and T5) and two on the other (T2 and T4). Each transmitter has a different spacing from the measure point X. The sonde is typically lowered into a well on a wireline cable and logged up the well, making measurements as it progresses. The data from the sonde is passed to the surface where it is recorded, processed and interpreted in a surface unit (not shown) in accordance with the invention.

The measurements made by this sonde consist of five different linear combinations of five basic, differential measurements. Each simple, differential measurement is the ratio of two magnetic-dipole-pair signals with a common magnetic-dipole transmitter and two magnetic-dipole receivers. The magnetic dipoles are all axially aligned. In the point-dipole approximation, the signals are described by the close-form expression:

$$U = -i\omega\mu\vec{M}_R \cdot \vec{H}_T = -i\omega\mu M_R M_T \frac{e^{ikr}}{4\pi r^3}(1-ikr)$$

The circular frequency ω is known; the relative magnetic permeability $\mu_r$ is assumed to be $\mu_r=1$. The receiver-dipole moments are normalized and assumed to be equal. The ratio of the two signals from receivers at distances $r_{near}$ and $r_{far}$ becomes in logarithmic form:

$$i\ln\frac{U_{near}}{U_{far}} = PS + iAT = k(r_{far}-r_{near}) + 3i\ln\frac{r_{far}}{r_{near}} + i\ln\left(\frac{1-ikr_{near}}{1-ikr_{far}}\right)$$

This equation is inverted for the wave number k, using the iterative relationship given above. The iteration preferably starts with the far-field approximation as an initial estimate for k. However, some other suitable estimate may serve as a starting value. The far-field approximation assumes that kr>>1. In this limit, the third, logarithmic term is simplified and combined with the second term. The simplified equation is then readily inverted for the initial estimate:

$$PS + iAT \cong k^{(0)}(r_{far}-r_{near}) + 2i\ln\frac{r_{far}}{r_{near}} \Rightarrow k^{(0)}$$
$$= \frac{1}{r_{far}-r_{near}}\left(PS + i\left(AT - 2\ln\frac{r_{far}}{r_{near}}\right)\right)$$

In equation above only the wave number k depends on the complex dielectric constant:

$$k=\omega/c\sqrt{\mu\in^*}$$

with the derivative $$\partial k/\partial \in^* = (\omega/2c)\sqrt{\mu/\in^*}.$$

The close-form expression of the equation is readily differentiated with respect to the complex dielectric constant with the chain rule:

$$\frac{\partial (PS+iAT)}{\partial \varepsilon^*} = \frac{\partial (PS+iAT)}{\partial k}\frac{\partial k}{\partial \varepsilon^*}$$

$$= \left[ \frac{(r_{far} - r_{near}) +}{\frac{r_{near}}{1 - ikr_{near}} - \frac{r_{far}}{1 - ikr_{far}}} \right] \frac{\omega}{2c} \sqrt{\frac{\mu}{\varepsilon^*}}$$

This derivative is a simple, complex-valued quantity that implies the Cauchy-Riemann identities because it contains one two independent components.

The true five-transmitter tool (see FIG. 1) uses linear combinations of these simple, three-antenna measurements for the final results. The differentiation and iterative inversion relationship are fully compatible with the linear combination procedure.

The inversion algorithm is presented for magnetic point dipoles, since they permit a close-form solution. Furthermore, the sensitivity of the tool measurements to the dielectric permittivity is quite weak. For most of the resistivity range the dielectric response can be approximated by a linear or close to linear function. The sensitivity to dielectric permittivity is then simply the derivative—or the slope of this linear function. This slope will not change appreciably between the true tool response and its point-dipole approximation.

Figure 2:
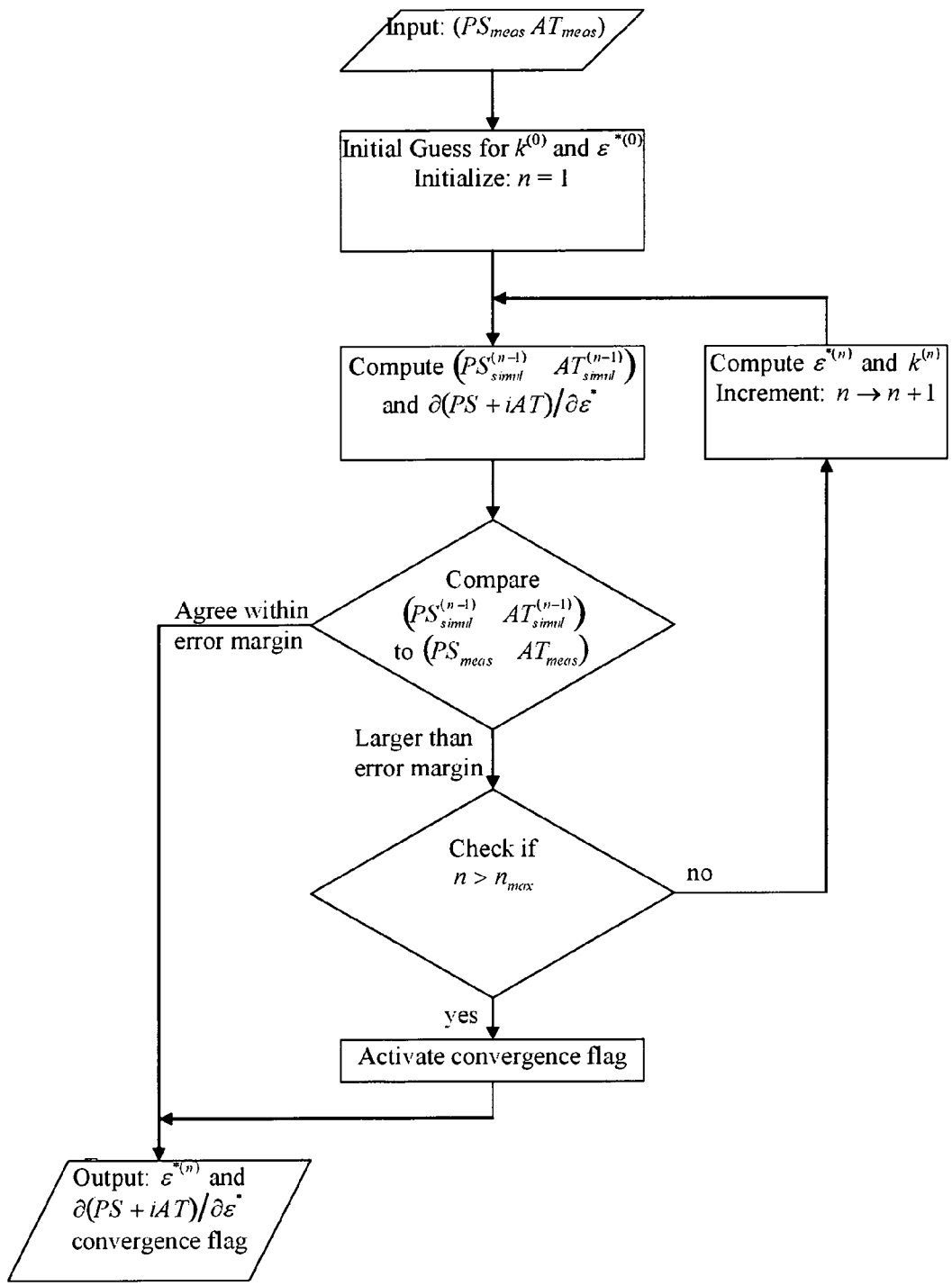
FIG. 2 is a flow diagram of data processing in accordance with a method of the invention.

FIG. 2 shows a flow diagram outlining the major steps for an implementation of an embodiment of the invention. The inputs to the process are measurements of phase shift PS and attenuation AT. An initial estimate of wavenumber $k^{(0)}$ and complex dielectric $\in^{*(0)}$ constant are taken for an initial iteration step (n=1). Values for $PS_{simul}^{m-1}$, $AT_{simul}^{n-1}$ and $$\frac{\partial(PS + iAT)}{\partial \varepsilon^*}$$

are computed using the relationships $$i\ln\frac{U_{near}}{U_{far}} = PS + iAT$$

$$= k(r_{far} - r_{near}) + 3i\ln\frac{r_{far}}{r_{near}} + i\ln\left(\frac{1 - ikr_{near}}{1 - ikr_{far}}\right)$$

and $$\frac{\partial(PS + iAT)}{\partial \varepsilon^*} = \frac{\partial(PS + iAT)}{\partial k} \frac{\partial k}{\partial \varepsilon^*}$$

$$= \left[ \frac{(r_{far} - r_{near}) +}{\frac{r_{near}}{1 - ikr_{near}} - \frac{r_{far}}{1 - ikr_{far}}} \right] \frac{\omega}{2c} \sqrt{\frac{\mu}{\varepsilon^*}}$$

The computed and measured values of PS and AT are compared and checked against a predetermined error margin. If the comparison is within the predetermined error margin, values are output for $\in^{*(n)}$ and $$\frac{\partial(PS + iAT)}{\partial \varepsilon^*}$$

If the comparison is outside this margin, the number of the iteration step is checked against a predetermined maximum. If the current step is greater than this maximum, the computed values are output as before. If the current step is within the predetermined maximum, new values of $\in^{*(n)}$ and $k^{(n)}$ are computed according to the relationship $$\varepsilon_r^{*(n)} = \varepsilon_r^{*(n-1)} + \left(\frac{\partial(PS + iAT)}{\partial \varepsilon_r^*}\right)^{-1} \left( \begin{array}{c} (PS_{meas} - PS_{simul}^{(n-1)}) + \\ i(AT_{meas} - AT_{simul}^{(n-1)}) \end{array} \right)$$

and its associated relationships (see above). These values are then input into the computation of $PS_{simul}^{m-1}$, $AT_{simul}^{n-1}$ and $$\frac{\partial(PS + iAT)}{\partial \varepsilon^*}$$

for the next iteration step n and the comparison repeated as described above.

Various changes may be made while remaining within the scope of the invention.

The invention claimed is:

1. A method of determining the dielectric constant of a formation, comprising:
    conveying a resistivity sonde within a well that extends into the formation, wherein the resistivity sonde comprises an electromagnetic transmitter and receiver;
    acquiring with the resistivity sonde phase-related and amplitude-related measurements for electromagnetic signals propagating though the formation from the transmitter to the receiver, wherein the phase-related measurement is phase and/or phase shift, and the amplitude-related measurement is amplitude and/or attenuation;
    transmitting the acquired phase-related and amplitude-related measurements to a surface unit via a wireline cable extending between the surface unit and the resistivity sonde in the well; and
    operating the surface unit to execute instructions for:
        deriving a complex value comprising terms relating to the phase or the phase shift and the amplitude or the attenuation of the signals;
        defining a one-component complex-valued relationship relating the phase-amplitude pair or the phase-shift-attenuation pair and the complex dielectric constant; and
    using the derived complex value in the defined relationship to obtain a calculated value of the complex dielectric constant
    wherein the relationship has the iterative form $$\varepsilon_r^{*(n)} = \varepsilon_r^{*(n-1)} + \left(\frac{\partial(PS + iAT)}{\partial \varepsilon_r^*}\right)^{-1} \left( \begin{array}{c} (PS_{meas} - PS_{simul}^{(n-1)}) + \\ i(AT_{meas} - AT_{simul}^{(n-1)}) \end{array} \right)$$

where $\in_r^*$ is the complex dielectric constant, the superscripts n−1 and n relate to the n−1$^{th}$ and n$^{th}$ iterations respectively, and the subscripts meas and simul indicate measured and simulated values respectively.

2. A method as claimed in claim 1, further comprising operating the surface unit to execute instructions for computing $PS_{simul}^{m-1}$ and $AT_{simul}^{n-1}$ using an initial value of $\in_r^*$, comparing the computed values with corresponding measured values and comparing any difference to a predetermined error margin, updating the value of $\in_r^*$ and repeating the computation and comparison until the difference falls within the predetermined error margin.

3. A method as claimed in claim 1, further comprising operating the surface unit to execute instructions for determining the resistivity of the formation from the complex dielectric constant.

4. A method as claimed in claim 1, wherein acquiring the phase-related and amplitude-related measurements comprises acquiring a phase measurement.

5. A method as claimed in claim 1, wherein the acquiring the phase-related and amplitude-related measurements comprise acquiring a phase shift measurement.

6. A method as claimed in claim 1, wherein the acquiring the phase-related and amplitude-related measurements comprises acquiring an amplitude measurement.

7. A method as claimed in claim 1, wherein acquiring the phase-related and amplitude-related measurements comprises acquiring an attenuation measurement.

8. A method as claimed in claim 1, wherein acquiring the phase-related and amplitude-related measurements comprises acquiring phase and amplitude measurements.

9. A method as claimed in claim 1, wherein the acquiring the phase-related and amplitude-related measurements comprises acquiring phase shift and attenuation measurements.

10. A method as claimed in claim 2, further comprising operating the surface unit to execute instructions for computing a value for measurement sensitivity in the form $$\frac{\partial(PS+iAT)}{\partial \varepsilon^*}.$$

11. A method as claimed in claim 10, wherein the receiver comprises near and far receivers, and wherein the electromagnetic signals are signals propagating through the formation from the transmitter to the near and far receivers, the method further comprising operating the surface unit to execute instructions for obtaining a value of wave number k and using this and the value of $\varepsilon_r^*$ to compute $PS_{simul}^{m-1}$, $AT_{simul}^{n-1}$ and $$\frac{\partial(PS+iAT)}{\partial \varepsilon^*}$$

using the relationships $$i\ln\frac{U_{near}}{U_{far}} = PS + iAT$$
$$= k(r_{far}-r_{near}) + 3i\ln\frac{r_{far}}{r_{near}} + i\ln\left(\frac{1-ikr_{near}}{1-ikr_{far}}\right)$$

and $$\frac{\partial(PS+iAT)}{\partial \varepsilon^*} = \frac{\partial(PS+iAT)}{\partial k}\frac{\partial k}{\partial \varepsilon^*}$$
$$= \left[(r_{far}-r_{near}) + \frac{r_{near}}{1-ikr_{near}} - \frac{r_{far}}{1-ikr_{far}}\right]\frac{\omega}{2c}\sqrt{\frac{\mu}{\varepsilon^*}}$$

where $U_{near}$ and $U_{far}$ are the near and far receiver signals, $r_{near}$ and $r_{far}$ are the distances from the transmitter to the near and far receiver, ω is the circular frequency and μ is the magnetic permeability.

* * * * *